UNITED STATES PATENT OFFICE.

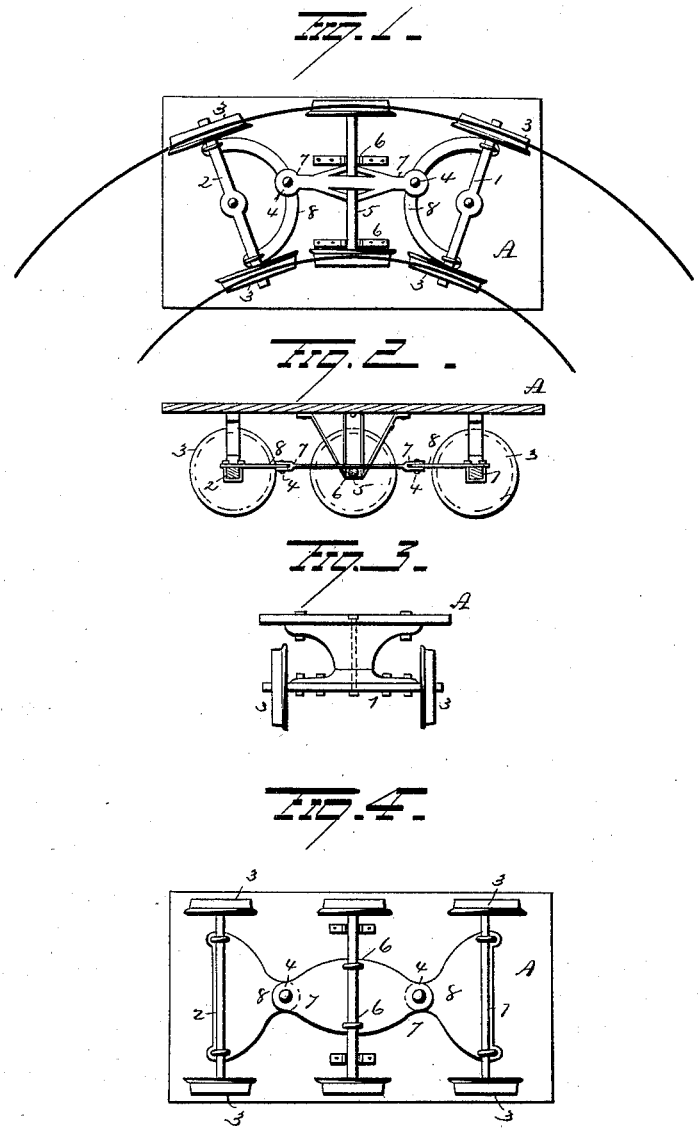

EDWARD HUBER, OF MARION, OHIO.

TRUCK FOR CARS.

SPECIFICATION forming part of Letters Patent No. 422,079, dated February 25, 1890.

Application filed December 6, 1889. Serial No. 332,801. (No model.)

*To all whom it may concern:*

Be it known that I, EDWARD HUBER, of Marion, in the county of Marion and State of Ohio, have invented certain new and useful Improvements in Trucks for Cars; and I do hereby declare the following to be a full, clear, and exact description of the invention, such as will enable others skilled in the art to which it appertains to make and use the same.

My invention relates to an improvement in trucks for cars, the object being to provide facilities for turning short curves, and for this reason my improved truck is made particularly applicable for factory, mine, and mill use.

With these ends in view my invention consists in certain novel features of construction and combinations of parts, as will be hereinafter described, and pointed out in the claim.

In the accompanying drawings, Figure 1 is a bottom plan view of the truck. Fig. 2 is a vertical longitudinal section. Fig. 3 is a transverse section, and Fig. 4 is a modification.

A represents the platform of the truck, and 1 and 2 are the outer axles upon which the platform is supported. These axles extend loosely into the hubs of wheels 3 3, and the platform is pivotally connected, by bolts or similar means 4 4, with the axles 1 and 2, and the middle axle 5 is loosely supported in boxes 6 6, depending from the lower side of the platform, and the ends of this axle also extend loosely into the hubs of wheels 3 3. The object of the depending boxes is to admit of a sliding endwise movement of the middle axle when the truck turns a curve.

Reaches 7 7 project outward in opposite directions from the middle axle, and said reaches are pivotally connected with corresponding reaches 8 8, projecting inwardly from the outer axles, so that while the three axles are virtually pivoted together and the platform has a pivotal connection with the outer axles, by virtue of the sliding connection of the middle axle with the platform, said axle is capable of automatically changing its position to the required angles to accommodate itself to the curve which the truck may be turning.

From the construction shown, and also from the description, it is seen that the truck will turn with ease very sharp curves, and when employed in mills and factories, in which they have been thoroughly tested, they have been found to turn curves of five-foot radius with the utmost ease, and not only is the frictional contact with the rails (which is more or less unavoidable) greatly lessened, but in going around curves the weight of the load is automatically shifted to the inside, thereby counteracting the tendency to tip over due to centrifugal force.

It is evident that slight changes might be resorted to in the form and arrangement of the several parts described without departing from the spirit and scope of my invention, and hence I do not wish to limit myself to the particular construction herein set forth; but, Having fully described my invention, what I claim as new, and desire to secure by Letters Patent, is—

The combination, with a platform, two axles pivoted thereto at or near the ends thereof and provided with inwardly-projecting reaches, and an intermediate axle journaled in bearings and free to slide longitudinally therein, each axle having a loose wheel or wheels thereon, of a reach secured to said sliding axle and pivotally connected at its ends to the reaches on the front and rear axles, substantially as set forth.

In testimony whereof I have signed this specification in the presence of two subscribing witnesses.

EDWARD HUBER.

Witnesses:
 CHAS. L. WEEDEN,
 JOHN J. CRAWLEY.